3,237,060
ELECTROLYTIC CAPACITORS
Sidney D. Ross, Williamstown, Mass., assignor to Sprague Electric Company, North Adams, Mass., a corporation of Massachusetts
Filed Aug. 29, 1961, Ser. No. 134,732
9 Claims. (Cl. 317—230)

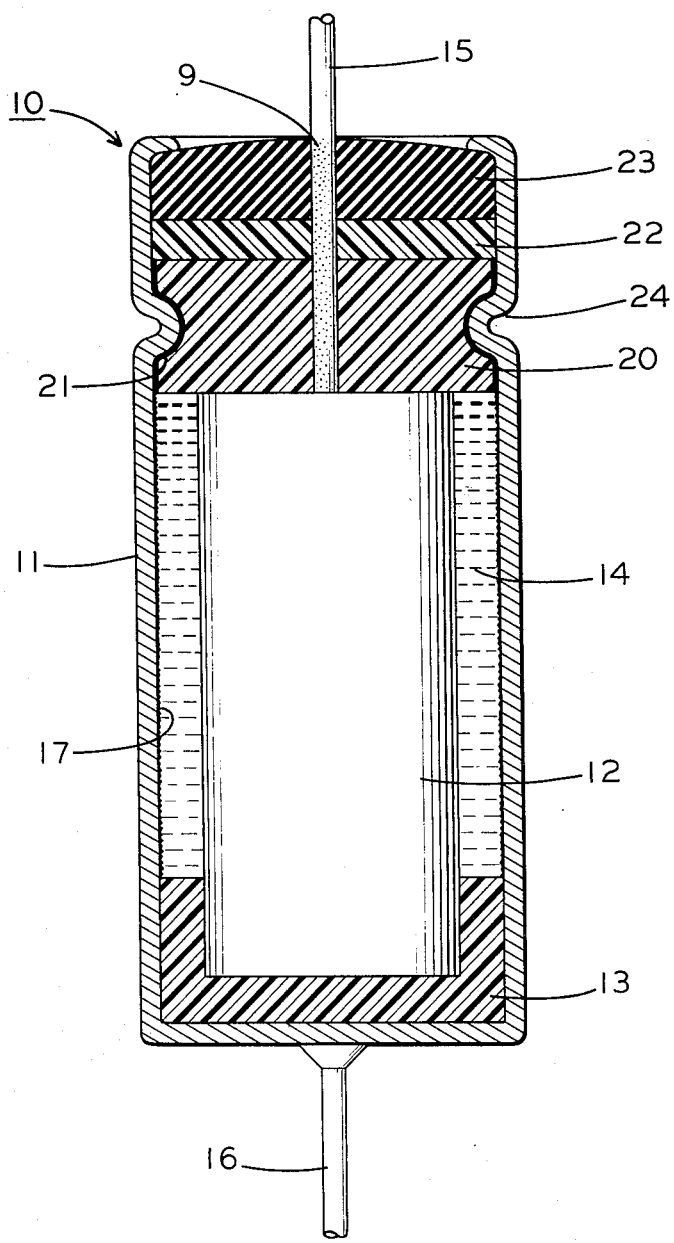

This invention relates to an electrolytic capacitor and particularly to an improved seal for electrolytic capacitors.

The advent of transistor electronics has aggravated the present increasing demand for miniaturized components. In this field of electronics, components are being subjected to relatively low potentials with the imposed requirement that they be of extremely small size so that large numbers of components could be incorporated into the extremely complex electronic mechanisms now in present day useage. This miniaturization has brought about extreme difficulty with electrolytic capacitors in which electrolytic solutions must be maintained within the confines of these relatively small structures. The amount of electrolytic solution needed therefore is so minute that the egress or loss of a minute volume will make the structure inoperative. Obviously the problem of electrolytic loss is not limited to miniaturized capacitors.

The instant invention is particularly applicable to capacitors containing a strong acid electrolyte, e.g. sulfuric acid, having pronounced creeping tendencies. In addition to the natural tendency of a sulfuric acid solution to surface creepage there is the additional factor that in an electrolytic capacitor some heat is generated within the device. This heat results in the acid electrolyte becoming generally more active and in an increase in pressure within the sealed container, thus increasing the tendency to creep.

In conjunction with the problem of creepage, there is the additional problem of maintaining the hermetic character of the seal over a wide range of temperatures. Sometimes the device in which a capacitor is a component may undergo a sharp temperature change in a matter of minutes or hours. It is therefore of the utmost importance that the various characteristics of the seal be maintained over such a temperature range regardless of how fast the temperature may vary.

Heretofore, the problem of electrolyte creepage has been coped with by merely mechanical means such as requirement of the ultimate in close tolerances between electrode lead or leads and the sealing plugs or discs and between the plugs and the electrolyte container wall. These close tolerances have also been achieved by the use of a caulking material in conjunction with the discs. By and large, under normal conditions, such means have been successful. However, under above-normal conditions the seal may fail and, as far as is known, no provision has been made for re-sealing the capacitor once the initial seal has been broken.

It is an object of the present invention to overcome the foregoing and related disadvantages of the presently known electrolytic capacitors.

It is a further object of this invention to provide a safety or secondary seal in the vent of failure of the primary seal.

Further objects of this invention will become apparent from the following description and appended claims when read in conjunction with the accompanying drawing, wherein the sole figure shows a capacitor constructed in accordance with a preferred embodiment of this invention.

The objects of this invention have been achieved by the fabrication of an electrolytic capacitor comprising an electrolytic capacitor unit containing a strong acid electrolyte, oxide coated lead-wire or wires extending from said capacitor section and three sealing discs positioned about said lead in stacked relationship.

More particularly, the objects have been attained by employing in an electrolytic capacitor a safety or secondary sealing disc, which is relatively basic or alkaline, positioned between two relatively inert sealing discs.

It is observed that in a conventional capacitor when the seal fails, the electrolyte finds an avenue of escape at points between the periphery of the sealing disc and the container wall and also between the spaces about the lead-wire and the central hole in the disc. When this occurs the effectiveness of the capacitor is depleted in short order. It has now been found that in sealing an electrolytic capacitor that if a comparatively basic or alkaline polymeric disc is sandwiched between a primary inert polymeric sealing disc and a relatively inert elastomeric disc, a break in the primary seal can be corrected by utilizing the first traces of escaping electrolyte as a means of re-sealing the capacitor. This is accomplished by taking advantage of the fact that the electrolyte will react with and/or swell the polymer. Thus, creepage will be eliminated by such a reaction. Also by maintaining the three discs in extremely close relationship by compression, the swelling of the safety disc due to the reaction between the electrolyte and that portion of the safety disc with which it comes in contact, can only exert its pressure in a lateral direction. Thus in effect, the reaction causes a constriction of the central hole in the secondary disc or an expansion at the periphery of the secondary disc, thereby cutting off passage of electrolyte past the secondary disc.

Basic or alkaline polymers suitable for the safety or secondary sealing disc are those which contain a reactive amine group.

Representatives of such polymers are epoxy resins of the type made with amine catalysts (or hardeners, or curing agents, or activators) such as methylene-bis-aniline, p-phenylenediamine, diethylenetriamine, etc. In forming the foregoing polymers comparatively high basicity and available amine groups can be assured by controlling the ratio of amine catalysts to epoxy groups. Polymers of this type are well known in the art and form no part of the instant invention. For example, the text "Epoxy Resins" by Lee and Neville, McGraw-Hill Book Company, Inc., New York, 1957, discloses suitable resins operable herein.

Other suitable polymers are polymers of substituted aminoethylacrylates and methacrylates represented by the following general formulas:

(1)
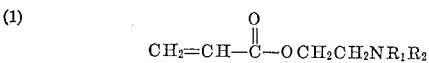

and (2)
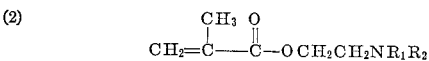

wherein $R_1$ is hydrogen or an alkyl group of 1–8 carbon atoms and $R_2$ is an alkyl group of 1–8 atoms.

Still another class of operable resins are the polymers of 2-vinyl pyridine, 3-vinyl pyridine, and 4-vinyl pyridine.

Yet another class are the polymers obtained by nitrating polystyrene and reducing the nitro-groups to amine groups. Again all the foregoing polymers also are old and well known in the art and need no further definition.

In general any moldable resin containing an alkaline amine group reactable with the strong acid electrolyte finds utility in improving the seal of the instant capacitor.

In a specific embodiment of this invention a tantalum pellet anode having a lead welded thereto is inserted into a silver cathode can. The pellet and riser portion of the lead has a dielectric oxide coating formed thereon. A 40% sulfuric acid electrolyte is placed in the can and a polytetrafluoroethylene (Teflon) disc is positioned about the lead. The Teflon disc has a groove cut around the middle thereof extending inwardly of the disc appreciably from the vertical lateral surface. This groove received a caulking material such as polybutadiene. The riser portion of the lead is also coated with this material. The disc is then forced down the lead-wire to the end of the electrode. This forms the primary seal of the capacitor. There is next positioned adjacent to and contacting this primary seal the relatively basic or alkaline polymeric disc of the type described supra. This forms the secondary or safety seal. Next a third seal of a more resilient elastomeric substance such as trifluorochloroethylene-vinylidene chloride co-polymer (Kel-F elastomer), is positioned adjacent to and contacting the secondary seal. This third seal receives the edge of the capacitor can through spinning which compresses the three discs to within a very close tolerance. The can is then interengaged into the cut groove in the Teflon disc. In the event the primary seal fails, the sulfuric acid begins creeping through the seal. An infinitesimal amount of the acid will contact the alkaline disc causing a reaction and/or swelling which effectively seals off any further creepage of the acid. This reacted and/or swollen area will not further react with sulfuric acid, but rather acts as a barrier to any additional creepage of the acid.

The sole figure of the drawing shows a capacitor 10 which has a silver cathode can 11 containing a tantalum anode 12. The tantalum anode is composed of sintered particles yielding a pellet of a density of approximately one-half of the density of tantalum metal. The anode is extended into the can, set on a spacer 13 and immersed in electrolyte 14 which is contained in the can and which surrounds and permeates the porous anode. The silver can is platinized 17 on its inner surface to increase its apparent surface. Both the anode and cathode have leads 15 and 16 extending therefrom. Both the tantalum anode 12 and the riser portion of lead 15 have an oxide coating 9 thereon. A disc of a suitable material such as Teflon 20 is fitted in the open end of the can and abutted against the upper end of the anode. A caulking material 21 fills the grooved area about the edge of the Teflon disc. Positioned above and abutting against the Teflon disc is a relatively basic or alkaline polymeric disc 22. The plugging means for the open end of the can also includes a disc of a more resilient elastomeric substance 23 than the other two discs. After the three plugs are positioned in the can, they are compressed together by the spinning of the can wall. The side of the wall of the can is worked by suitable means such as rolling to indent a crimp 24 into the formed groove in the Teflon plug.

In view of the effectiveness of the secondary or safety seal the caulking material, used in conjunction with the primary Teflon seal, is deemed to be optional.

The instant invention may be applied to any valve-metal capacitor which may suffer from the creepage of a strong acid electrolyte. For example, the capacitor may have a conventional convolute capacitance section of wound valve-metal foil and spacer ribbons. Also the capacitor may be of the valve-metal wire type. The strong acid electrolyte may be in liquid or in gelled form. The invention is not to be limited to the particular structural design shown which is presented merely for illustrative purposes.

What is claimed is:

1. An electrolytic capacitor comprising a container, a strong acid electrolyte in said container and an end-seal having three stacked closure members sealing the end of said container, the first of said members being a primary seal nearest said electrlyte and comprising an inert inelastic high molecular weight polymer, the second of said members being a secondary seal abutting said primary seal and comprising an alkaline high molecular weight polymer containing an amine group reactive with said electrolyte, and the third of said members being a tertiary seal comprising a relatively inert high molecular weight elastomer in abutting and pressure exerting engagement with said secondary seal.

2. An electrolytic capacitor comprising a metal container housing a valve-metal electrode with a lead extending therefrom, a sulfuric acid electrolyte in said container, an end-seal having three sealing discs in stacked relationship sealing the end of said container and positioned about said lead abutting said electrode, the first of said discs nearest said electrolyte being an inert inelastic high molecular weight polymer, the second of said discs being a high molecular weight polymer containing alkaline amine groups, reactive with said electrolyte, and the third of said discs being a relatively inert high molecular weight elastomer, said container spun so as to firmly compress said discs together with said third disc in abutting and pressure exerting engagement with said second disc.

3. The electrolytic capacitor of claim 2 wherein said second disc is an epoxy resin formed with a high mol ratio of amine catalyst.

4. The electrolytic capacitor of claim 2 wherein said second disc is a polymer of an alkyl-substituted aminoethylacrylate.

5. The electrolytic capacitor of claim 2 wherein said second disc is a polymer of an alkyl-substituted aminoethylmethacrylate.

6. The electrolytic capacitor of claim 2 wherein said second disc is a polymer of vinyl pyridine.

7. The electrolytic capacitor of claim 2 wherein said second disc is a polymer obtained by nitrating polystyrene and reducing the nitro groups.

8. The electrolytic capacitor of claim 2 wherein said second disc is a member selected from the group consisting of an epoxy resin formed with a high mol ratio of amine catalyst, a polymer of an alkyl-substituted aminoethylacrylate, a polymer of an alkyl-substituted aminoethylmethacrylate, a polymer of vinyl pyridine, and a polymer obtained by nitrating polystyrene and reducing the nitro groups to amine groups.

9. An electrolytic capacitor comprising a silver cathode can, platinized on its inner surface, housing a porous anode pellet of sintered tantalum particles having a tantalum lead extending therefrom, said pellet and the riser portion of said lead having a tantalum oxide dielectric coating formed thereon, a sulfuric acid electrolyte in said can, an end-seal having three sealing discs in stacked relationship positioned about said lead and sealing said can, the first of said discs nearest the electrolyte being polytetrafluoroethylene, the second of said discs being an alkaline epoxy resin formed with diethylenetriamine reactive with said electrolyte, and the third of said discs being an elastomeric copolymer of trifluorochloroethylene and vinylidene chloride, said can spun so as to firmly compress said discs together with said first and third discs in abutting and pressure exerting engagement with said second disc.

References Cited by the Examiner

UNITED STATES PATENTS

| | | | |
|---|---|---|---|
| 2,144,959 | 1/1939 | Blackburn | 317—230 |
| 2,862,155 | 11/1958 | Budriski | 317—230 |
| 3,056,072 | 9/1962 | Schroeder et al. | 317—230 |

DAVID J. GALVIN, *Primary Examiner.*

JAMES D. KALLAM, *Examiner.*